(12) United States Patent
Keller et al.

(10) Patent No.: US 8,287,190 B2
(45) Date of Patent: Oct. 16, 2012

(54) BEARING ARRANGEMENT FOR A ROLL OF A ROLLING MILL STAND

(75) Inventors: Karl Keller, Hilchenbach (DE); Kurt Scheffe, Hilchenbach (DE)

(73) Assignee: SMS Siemag AG, Duesseldorf (DE)

( * ) Notice: Subject to any disclaimer, the term of this patent is extended or adjusted under 35 U.S.C. 154(b) by 294 days.

(21) Appl. No.: 12/661,575

(22) Filed: Mar. 19, 2010

(65) Prior Publication Data

US 2010/0239203 A1    Sep. 23, 2010

(51) Int. Cl.
*F16C 43/04* (2006.01)
*F16B 37/08* (2006.01)

(52) U.S. Cl. .......................... 384/556; 411/434; 411/937

(58) Field of Classification Search .................. 384/556; 411/433, 434, 937, 937.2
See application file for complete search history.

(56) References Cited

U.S. PATENT DOCUMENTS

| | | | |
|---|---|---|---|
| 3,080,199 A | | 3/1963 | Rickley |
| 4,286,830 A | * | 9/1981 | Salter, Jr. ...................... 384/584 |
| 4,551,032 A | * | 11/1985 | Mottershead ................. 384/517 |
| 4,995,147 A | * | 2/1991 | Ahrweiler et al. .............. 492/16 |
| 6,415,489 B1 | * | 7/2002 | Martins et al. .................. 29/252 |
| 7,377,696 B2 | * | 5/2008 | Scheffe et al. ................. 384/587 |
| 7,857,522 B2 | * | 12/2010 | Osgood et al. ................ 384/586 |
| 8,037,585 B2 | * | 10/2011 | Keller et al. ..................... 29/252 |

OTHER PUBLICATIONS

K. Roeingh and W. Scheffel, New developments for a more cost-effective application of MORGOIL® bearings in modern flat rolling mills, SARUC 2000 Conference, Vanderbijlpark, South Africa, Oct. 5, 2000.

* cited by examiner

*Primary Examiner* — Thomas R Hannon
*Assistant Examiner* — Adam D Rogers
(74) *Attorney, Agent, or Firm* — Abelman, Frayne & Schwab

(57) ABSTRACT

A bearing arrangement for a roll of a rolling mill stand includes a bearing for supporting a roll neck, a hydraulic device for securing the bearing on the roll neck and having a hydraulic piston supported against the roll neck, and a hydraulic cylinder displaceable relative to the hydraulic piston, the hydraulic piston having an outer thread on which a circular nut having a circular base body is screwable for supporting the hydraulic cylinder with respect to the hydraulic piston, with the nut having a circular projection extending coaxially with the circular base body and completely attached to the circular base body.

11 Claims, 3 Drawing Sheets

BEARING ARRANGEMENT FOR A ROLL OF A ROLLING MILL STAND

BACKGROUND OF THE INVENTION

1. Field of the Invention

The present invention relates to a bearing arrangement for supporting a neck of a roll of a rolling mill stand.

2. Description of the Prior Art

The prior art discloses a number of bearing arrangements for rolls of rolling mill stands. Thus, German Patent DE 1 254 108 discloses a bearing arrangement in which an axial bearing rotatably supports a neck of a roll. A circular nut, which is screwed on a neck extension provided with an outer thread, fixes the axial bearing in the axial direction. The fixation is effected with a circular shoulder of the circular nut that presses the axial bearing against a stop in form of a sleeve ring. The circular nut has an outer circular shoulder for interaction with a circular shoulder of a housing ring of the axial bearing upon a reverse rotation of the circular nut for dismounting of the axial bearing from the roll neck. Thereby, the axial bearing is mechanically released by axial forces transmitted by the thread. For releasing the nut traditionally a crane cable is used, which is dubious, however, from a technical point of view. Besides, with release or mounting of the nut with a crane cable, axial forces applied to the axial bearing by the circular nut or its circular shoulder, cannot be precisely adjusted.

In order to avoid the above-mentioned drawbacks, for some time, another bearing arrangement is used which is shown in FIG. 3 (see "New Developments for a More Cost-Effective Application of Morgoil-Bearings in Modern Flat Rolling Mills" by K. Roeingh and W. Scheffel, reprint of a paper presented at SARUC 2000 Conference in Vanderbijlpark, South Africa, on Oct. 5, 2000; presenter-SMS Demag AG, Eduard-Schloemann-Strasse 4, Duesseldorf, Germany). With this bearing arrangement, an axial bearing 110 is secured on a roll neck 210 of a roll 200 with a hydraulic device 120. The hydraulic device 120 has a hydraulic piston 122 and a hydraulic cylinder 124 displaceable relative to each other. The fixation of the bearing 110 is effected by pressing the bearing with the hydraulic cylinder 124 in the direction of roll camber against a stop 30 in form of sleeve ring. The hydraulic piston 122 is supported, in the axial direction, mechanically against the roll neck 210. On the hydraulic piston 122, an outer thread 123 is provided. A circular nut body 132 of a circular nut 130 is screwed on the thread 123. The circular nut serves as a stop for the hydraulic cylinder 124 when it is pressed against the circular nut 130 as a result of application of axial forces which can be generated during operation of the roll.

Very large axial forces, which are generated during a rolling process in the form of an inclined take-off force that, with a radially acting rolling force, total separating force TSF/2, acts, as a partial component of the rolling force, on a conical portion 210a of the roll neck 210. This inclined take-off force $F_H$ is transmitted to the roll neck 210 by the neck sleeve 320, the opposite stop, i.e., the sleeve ring 300, the axial bearing 110, the hydraulic cylinder 124, the circular nut 130, and the hydraulic piston 122. In addition to the inclined take-off force $F_H$, an additional axial force component is generated at a so-called cross-rolling, i.e., at joggling of the rolls. This axial force component can act in the same direction as the inclined take-off force or in the opposite direction. The sum of the inclined take-off force, which is generated as a result of cross-rolling, will be referred to simply as axial force.

The axial force, if it is not absorbed, as will be described, in the following sentence, causes displacement of the axial bearing 110 and the hydraulic cylinder 124 away from the roll. However, the axial force is absorbed by the circular nut 130 which, in turn, is supported, via the outer thread 123 of the hydraulic piston 122, against the hydraulic piston 122 that, in turn, is supported against the roll neck 210. In this way, the axial force is transmitted to the roll neck and is absorbed thereby.

As a result of the hydraulic cylinder 124 being pressed, without being actuated, by axial forces against the circular nut 130, the nut 130 is pushed back, as shown in FIG. 4. This is disadvantageous. The reverse push means that a bending or reverse torque acts on the nut, which results in that the nut partially looses contact with the outer thread on which the nut is screwed on. This means that the contact surface of a thread pitch between the circular nut and the hydraulic piston 122 is reduced. This again results in the remaining thread contact surface becoming more loaded by the remaining axial force component, which, with time, leads to the distortion of the thread and thereby to the elimination of the ability of the neck roll to absorb the acting axial force.

Proceeding from this state of the art, the object of the invention is to so modify the known bearing arrangement for a roll of a rolling mill stand that transmission of the axial force from the hydraulic cylinder to the hydraulic piston by the circular nut is insured even at large axial forces, i.e., at a large reverse torque produced by the axial forces.

SUMMARY OF THE INVENTION

This an other objects of the present invention, which will become apparent herebelow, are achieved by providing bearing arrangement of the type described above in which the circular nut has a circular projection extending coaxially with the circular base body and completely attached to the circular base body.

With a circular projection which is provided according to the present invention and which, advantageously, is attached to the base body of the circular nut in the peripheral region of the base body, circular nut formed of the base body and the projection, has a noticeably greater bending stiffness. Because of the large bending stiffness, the reverse pulling of the circular nut, i.e., local movement backward of separate windings of the thread under a load, occurs to a much smaller degree. It is further to be pointed out that the load remains substantially the same over the entire width of the thread. As a result greater axial forces can be diverted to the roll neck by the circular nut and the hydraulic piston.

The circular nut can only be released when the hydraulic cylinder is pressed against the circular nut not by axial forces, i.e., in a non-operational condition of the roll. For releasing the circular nut, firstly, hydraulic pressure is built up in the hydraulic cylinder, whereby the cylinder is displaced toward the bearing, so that the circular nut is relieved of axial forces and can be rotatated in the opposite direction. However, finally, the hydraulic cylinder is again displaced in the direction of the circular nut, whereby the gap between the circular nut and the hydraulic cylinder or the cylinder cover is closed again. In this operational condition, in the state of the art, the danger of injury of the operator's finger exists, in particular, the operators finger, could be jammed in the gap. With the inventive projection, which at least partially overlaps the hydraulic cylinder, the annular gap is covered and is not accessible for radially engaging objects, in particular, a finger. The danger of injury has already been recognized in the prior art. That is why in the prior art, the circular nut has a circular protective sheet which is welded, e.g., by tack welding, to the outer diameter of the circular nut. However, this circular protective sheet is not completely attached to the base body of the circular nut in distinction from the claimed projection. The protective sheet is spot-welded to the base body and, therefore, because of its very small thickness, does not contribute to the increase of the bending stiffness of the circular nut.

The language "completely attached" means that no slightest intermediate space or parting line exists between the circular projection and the base body of the circular nut. Rather, this language means that the projection is fixedly attached to the base body along its entire radial cross-sectional surface, e.g., welded thereto.

According to the preferred embodiment of the invention, the circular nut with the base body and the projection is formed as a solid one-piece part.

Advantageously, the transition region between the projection provided on the periphery of the base body and the base body is freely rotatable relative to the roll neck. With the freely rotatable transitional region, the region of application of the axial forces applied to the circular base body is limited to a region in the vicinity of the outer thread of the hydraulic piston. Thereby, advantageously, the reverse torque and the load on the thread are reduced.

According to an advantageous embodiment of the bearing arrangement according to the present invention, a radial extension of the circular base body amounts to 0.95-1.4 of its axial extension, a thickness of the projection amounts to 0.05-0.5 of the axial extension of the circular base body, and a ratio of an axial extension of the projection to its thickness amounts to 1.8-8.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
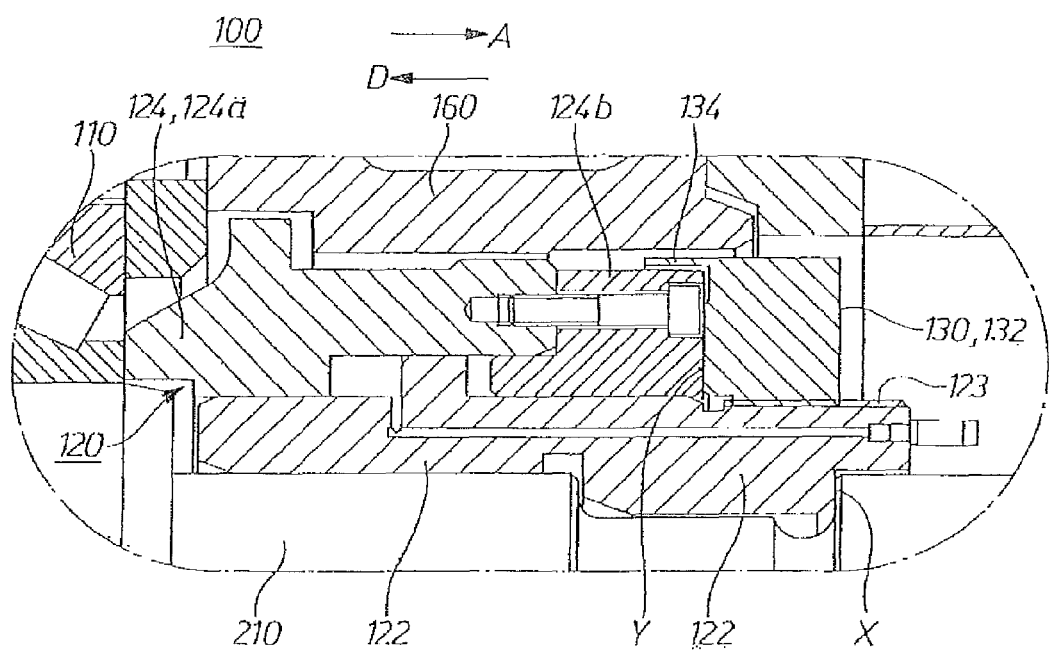
FIG. 1 a cross-sectional view of a bearing arrangement according to the present invention.
Figure 3:
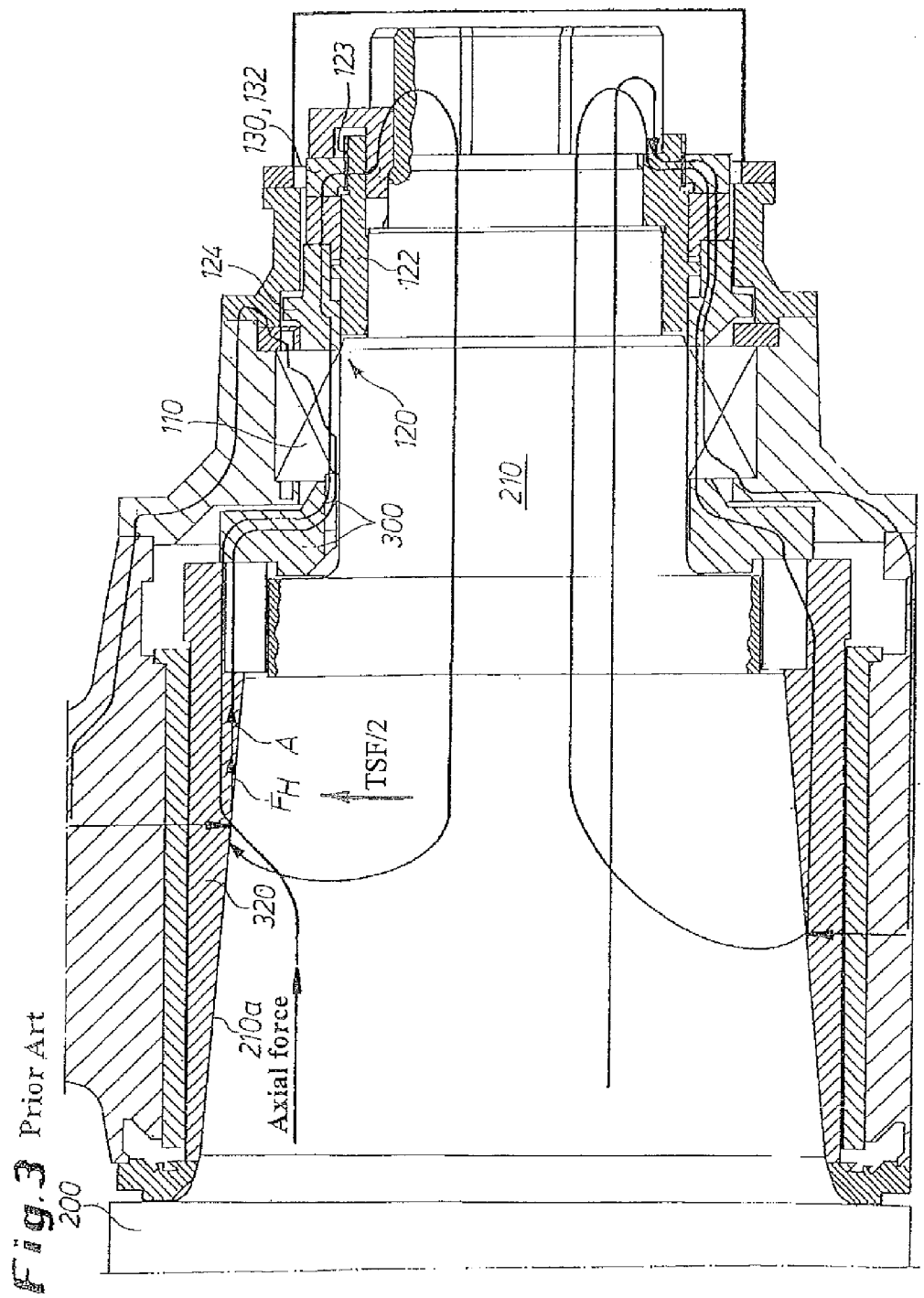
FIG. 3 a cross-sectional view of a prior art bearing arrangement.

A bearing arrangement 100 for a roll of a rolling mill stand, which is shown in FIG. 1, includes a bearing 110 for supporting a roll neck 210 and a hydraulic device 120. The hydraulic device 120 includes a hydraulic piston 122 supported, in an axial direction, against a flank X of the roll neck 210, and a hydraulic cylinder 124 displaceable relative to the hydraulic piston 122. The hydraulic cylinder 124 serves for mounting and dismounting of the bearing 110, e.g. an axial bearing or roller bearing, on or from the roll neck 210. The securing of the bearing 110 occurs with the hydraulic cylinder 124 pressing the bearing 110, in a non-operational condition of the roll, against a stop in form of a sleeve ring 300 (see FIG. 3). The pressure direction is designated in FIG. 1 with the letter D and is opposite the direction of axial forces A generated during the roll operation and which push the bearing 110 from the roll neck.

The term "hydraulic cylinder 124" does not differentiate, within the scope of the present invention, between the cylinder main body 124a and the cylinder cover 124b. Rather, the combination of both parts, as shown in FIG. 1, forms the hydraulic cylinder.

Figure 4:
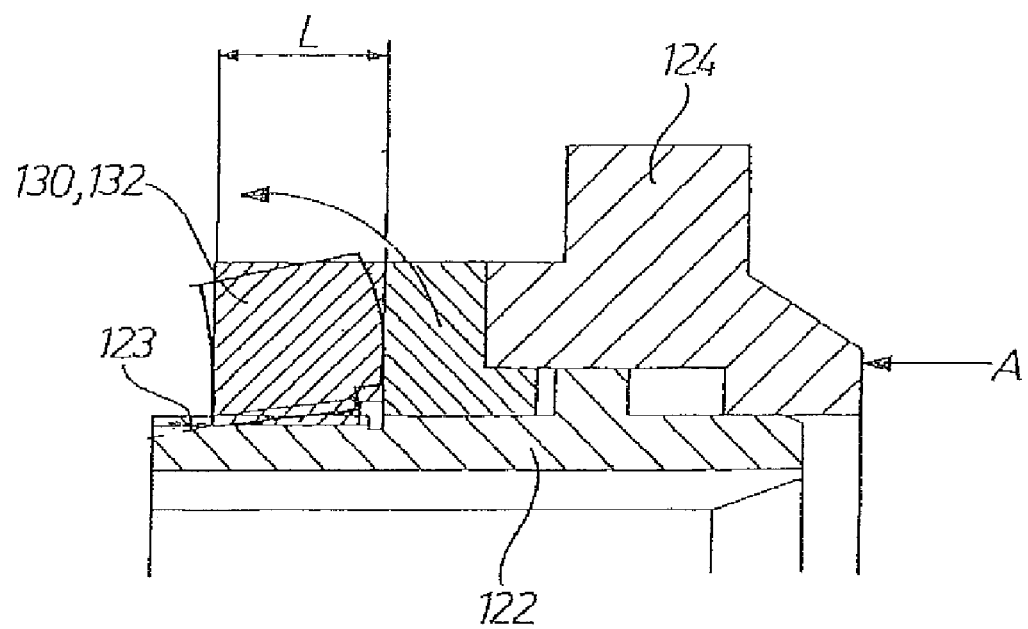
FIG. 4 a cross-sectional view of a detail of the prior art bearing arrangement with a circular nut in a loaded condition.

For limiting an axial displacement of the bearing 110 and of the hydraulic cylinder 124 during the roll operation, there is provided on a side of the hydraulic cylinder 124 remote from the bearing 110, a stop in form of a circular nut 130. The circular nut 130 or its circular base body 132 is screwed on an outer thread 123 of the hydraulic piston 122. The circular nut 130 serves for diverting axial forces which are transmitted thereto through the neck sleeve 320, the sleeve ring 300, the bearing 110, and the hydraulic cylinder 124, to the flank X of the roll neck 210 via the outer thread 123 of the hydraulic piston 122 and the hydraulic piston 122 itself. As a result of application of the axial forces, which act in the direction A, to the circular nut 130, the nut 130 is subjected to a bending or reverse torque, as indicated with an arrow in FIG. 4.

In order to be able to better withstand the action of the reverse torque and, in particular, to provide as optimal as possible contact with the hydraulic cylinder 124 via the outer thread 123, the circular nut 130 is formed, according to the invention, with a high bending stiffness. This is insured, according to the invention, by provision of a projection 134 that, preferably, is provided on a periphery of the circular nut 130 coaxially therewith and that overlaps the hydraulic cylinder 124 or, in particular, the cylinder cover 124b, at least partially. In this way, a very narrow circular space or constructional space between the hydraulic cylinder 124 or the cylinder cover 124b and the housing 110 of the bearing arrangement can be optimally used. The provision according to the invention, of the projection on the periphery of the circular nut 130, as shown in FIG. 1, permits to increase the bending stiffness of the circular nut 130 at a smallest height of the circular nut 130.

Advantageously, the transmission region between the projection 134 and the circular base body 132 of the circular nut 130 is provided on an inner side of the circular nut 130, i.e., on the side adjacent to the roll neck 210 and which is freely rotatable with respect to the roll neck 120, as can be seen in FIG. 1. As a result of free rotation, the engagement region for axial forces is spaced from the periphery of the circular nut 130 and is limited to a circular engagement region Y in the vicinity of the outer thread 123 of the hydraulic piston 122. In this way, the reverse torque is reduced, and tension in the thread 123 is further minimized. The force locking is optimally diverted to the outer thread 123.

According to the invention, the projection 134 is completely attached to the circular base body 132 of the circular nut 130. Ideally, the projection 134 is formed with the circular base body 132 as a one-piece element in order to achieve an optimal increase of the bending torque.

Figure 2:
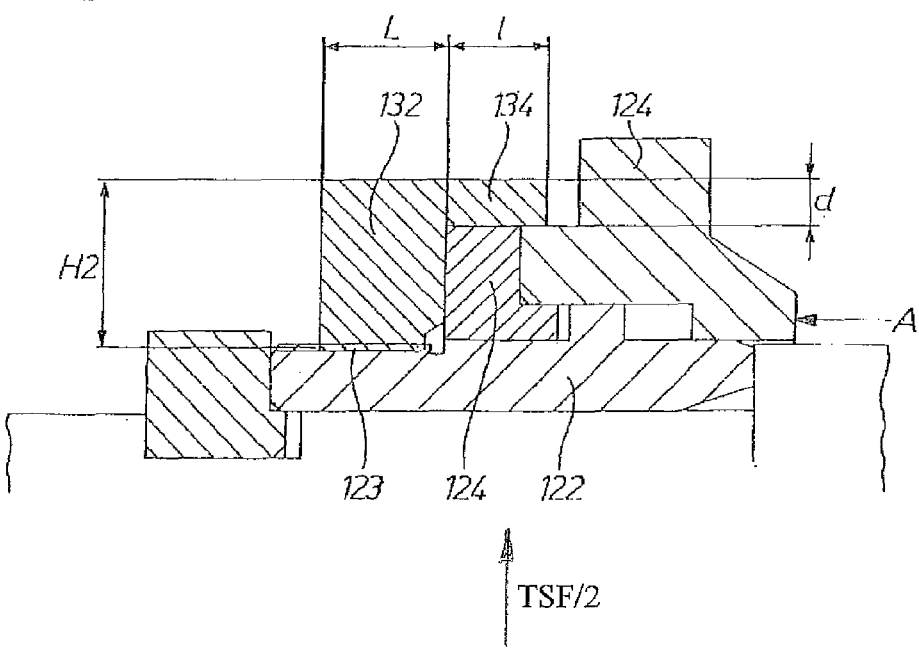
FIG. 2 a cross-sectional view of a detail of the bearing arrangement according to the present invention.

With reference to FIG. 2, an advantageous dimensioning of the circular nut 130 with respect to achieving a smallest constructional height while insuring, simultaneously, a maximal bending stiffness will be described.

It is advantageous, when the axial extension of the projection 134 is greater, preferably, twice as large as the thickness d of the projection 134. On the other hand, the axial extension 1 of the projection 134 should be smaller than the axial extension L of the circular base body 132 of the circular nut 130. The thickness d of the projection 134 is preferably smaller than the axial extent L of the circular base body 132. It is particularly advantageous when the radial extension H2 of the circular nut 130 corresponds to the sum of the axial extension L of the circular base body 132 and the thickness d of the projection 134. It is further advantageous when the ratio of the thickness d of the projection 134 to the axial extent L of the circular base body 132 amounts to about 4, and the ratio of the axial extension 1 of the projection 13 to the thickness d of the projection 134 in the radial direction amounts to about 2. The above-discussed dimensions of the circular nut 130 or the projection 134 with respect to the circular base body 132 can be realized separately or in combination.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A bearing arrangement for a roll of a rolling mill stand, comprising:
    a bearing for supporting a roll neck;
    a hydraulic device for securing the bearing on the roll neck and having a hydraulic piston supported against the roll neck and provided with an outer thread, and a hydraulic cylinder displaceable relative to the hydraulic piston; and
    a circular nut having a circular base body screwable on the outer thread of the hydraulic piston and a circular projection extending coaxially with the circular base body, completely attached to the circular base body and overlapping the hydraulic cylinder for supporting the hydraulic cylinder with respect to the hydraulic piston.

2. A bearing arrangement according to claim 1, wherein the circular nut with the projection and the circular base body is formed as a one-piece part.

3. A bearing arrangement according to claim 1, wherein the projection has an axial extension greater than a thickness thereof 4. A bearing arrangement according to claim 3, wherein the axial extension of the projection is two times greater than the thickness thereof.

5. A bearing arrangement according to claim 1, wherein the projection has an axial extension which is smaller than an axial extension of the circular base body.

6. A bearing arrangement according to claim 1, wherein the projection has a thickness which is smaller than an axial extension of the circular base body.

7. A bearing arrangement according to claim 1, wherein:
    a radial extension of the circular base body amounts to 0.95-1.4 of an axial extension thereof;
    a thickness of the projection amounts to 0.05-0.5 of the axial extension of the circular base body; and
    a ratio of an axial extension of the projection to the thickness thereof amounts to 1.8-8.

8. A bearing arrangement according to claim 1, wherein the projection is provided on a periphery of the circular base body.

9. A bearing arrangement according to claim 8, wherein a transition region between the projection provided on the periphery of the circular base body and the circular base body is freely rotatable relative to the roll neck.

10. A bearing arrangement according to claim 1, wherein the projection at least partially overlaps the hydraulic cylinder.

11. A bearing arrangement according to claim 1, wherein the circular projection is attached to the circular base body in a peripheral region of the circular base body.

* * * * *

UNITED STATES PATENT AND TRADEMARK OFFICE
CERTIFICATE OF CORRECTION

PATENT NO.       : 8,287,190 B2
APPLICATION NO.  : 12/661575
DATED            : October 16, 2012
INVENTOR(S)      : Karl Keller et al.

It is certified that error appears in the above-identified patent and that said Letters Patent is hereby corrected as shown below:

Title Page, insert Item (30)

-- (30) Foreign Application Priority Data
      March 20, 2009   (DE)....10 2009 014 100 --

Signed and Sealed this
Twenty-sixth Day of February, 2013

Teresa Stanek Rea
*Acting Director of the United States Patent and Trademark Office*